(12) United States Patent
Jeon et al.

(10) Patent No.: US 8,055,284 B2
(45) Date of Patent: *Nov. 8, 2011

(54) SYSTEM AND METHOD FOR PROVIDING NOTIFICATION MESSAGE IN DVB-H SYSTEM

(75) Inventors: Jin-Woo Jeon, Seongnam-si (KR);
Young-Seop Han, Suwon-si (KR);
Young-Jip Kim, Suwon-si (KR);
Byoung-Dai Lee, Seongnam-si (KR);
Hyun-Chul Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1077 days.

This patent is subject to a terminal disclaimer.

(21) Appl. No.: 11/840,056

(22) Filed: Aug. 16, 2007

(65) Prior Publication Data

US 2008/0045251 A1 Feb. 21, 2008

(30) Foreign Application Priority Data

Aug. 18, 2006 (KR) ........................ 10-2006-0078409

(51) Int. Cl.
*H04W 4/00* (2009.01)
*H04W 72/00* (2009.01)
(52) U.S. Cl. ........................................ 455/466; 455/450
(58) Field of Classification Search .................. 455/466,
455/10, 15, 12.1, 3.01, 3.06, 450, 434, 3.03–3.04,
455/414.1–414.2, 412.1–412.2; 709/217;
725/62, 101, 81, 112–113; 370/312–313,
370/329, 341, 335, 349
See application file for complete search history.

(56) References Cited

U.S. PATENT DOCUMENTS

| | | | | |
|---|---|---|---|---|
| 7,584,495 B2 * | 9/2009 | Hannuksela et al. | ......... | 725/101 |
| 7,614,068 B2 * | 11/2009 | Jansky | .............................. | 725/54 |
| 7,801,513 B2 * | 9/2010 | Jung et al. | ................... | 455/414.2 |
| 2006/0019618 A1 * | 1/2006 | Seppala | ......................... | 455/121 |
| 2006/0053450 A1 * | 3/2006 | Saarikivi et al. | ................. | 725/46 |
| 2006/0218586 A1 * | 9/2006 | Pohjolainen et al. | ............ | 725/39 |
| 2006/0253544 A1 * | 11/2006 | Luoma et al. | .................. | 709/217 |

(Continued)

FOREIGN PATENT DOCUMENTS

| | | |
|---|---|---|
| KR | 1020040067419 | 7/2004 |
| KR | 1020060006209 | 1/2006 |
| KR | 1020060085893 | 7/2006 |
| WO | WO 2005/041567 | 5/2005 |
| WO | WO 2006/027648 | 3/2006 |

OTHER PUBLICATIONS

Digital Video Broadcasting (DVB); IP Datacast Over DVB-H: Architecture, May 2006.

(Continued)

*Primary Examiner* — Brandon Miller
(74) *Attorney, Agent, or Firm* — The Farrell Law Firm, P.C.

(57) ABSTRACT

Disclosed is a system and a method for providing a terminal with a notification message reporting changes of a system and of a service in the middle of a Digital Video Broadcasting-Handheld (DVB-H) broadcasting service. The system inserts channel information related to the transmission of the notification message into Electronic Service Guide (ESG) service fragment or ESG acquisition fragment, then transmits the inserted channel information, or specifies a notification session for a session to transmit the session. In this manner, the channel information related to the notification message can be transmitted to a terminal through an ESG, and the terminal acquires the channel information related to the notification message from the received ESG to receive the notification message by using the channel information.

15 Claims, 10 Drawing Sheets

U.S. PATENT DOCUMENTS

| | | | |
|---|---|---|---|
| 2007/0041377 A1* | 2/2007 | Song et al. | 370/389 |
| 2007/0055786 A1* | 3/2007 | Pohjolainen et al. | 709/230 |
| 2007/0168534 A1* | 7/2007 | Hiltunen et al. | 709/230 |
| 2007/0240189 A1* | 10/2007 | Paila | 725/62 |
| 2007/0268883 A1* | 11/2007 | Quelle et al. | 370/349 |
| 2007/0300265 A1* | 12/2007 | Karkkainen | 725/62 |
| 2008/0046909 A1* | 2/2008 | Smetana et al. | 725/8 |
| 2008/0046926 A1* | 2/2008 | Jeon et al. | 725/38 |
| 2008/0072258 A1* | 3/2008 | Jeon et al. | 725/48 |

OTHER PUBLICATIONS

"Digital Video Broadcasting (DVB); IP Datacast over DVB-H: Electronic Service Guide (ESG), ETSI TS 102 471", ETSI Standards, Apr. 1, 2006.

Bosun Jung et al.: "Notification Section for TS Service Guide", Apr. 13, 2005.

Jack Lee et al.: "Modification of SGDD for Notification Function", Apr. 12, 2005.

* cited by examiner

```
<ClassificationScheme uri="urn:dvb:ipdc:esg:cs:ServiceTypeCS">
<Term termID="1.0">
<Name xml:lang="en">ContentType</Name>
<Definition xml:lang="en">Digital TV service </Definition>
<Term termID="1.1">
    <Name xml:lang="en">TV Service</Name>
    <Definition xml:lang="en"Digital TV service </Definition>
</Term>
<Term termID="1.2">
    <Name xml:lang="en">Radio Service</Name>
    <Definition xml:lang="en">Digital Radio Service</Definition>
</Term>
<Term termID="1.3">
    <Name xml:lang="en">Data Service</Name>
 .
 .
</Term>
<Term termID="1.4">
    <Name xml:lang="en">Notification Service</Name>
    <Definition xml:lang="en">ESG Notification Service</Definition>
</Term>
```

Figure 3:
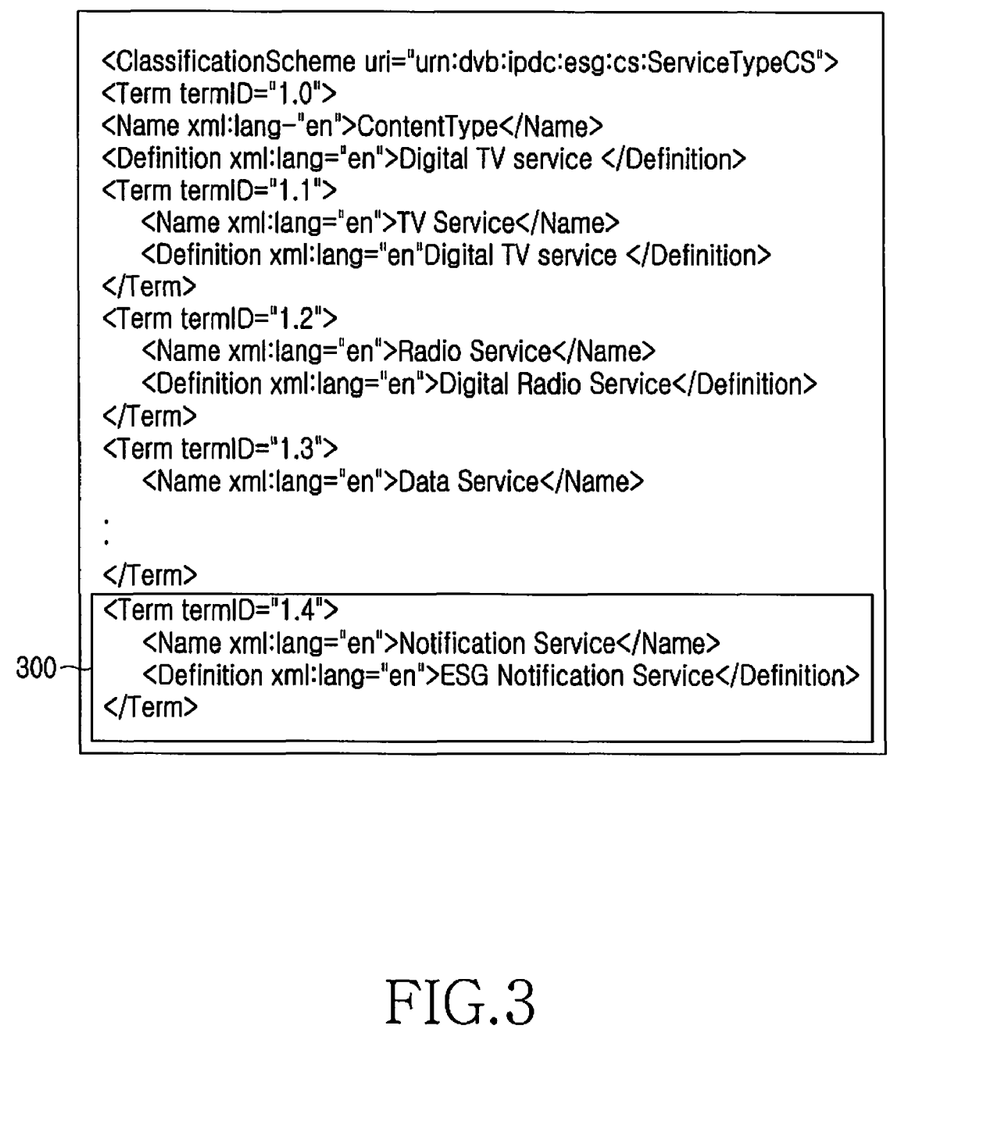
FIG. 3 illustrates an annex c. default classification scheme found in standards of Convergence of Broadcasting and Mobile Service Electric Service Guide (CBMS ESG) according to a preferred embodiment of the present invention.

300 points to the `<Term termID="1.4">` block.

| Syntax | No. of Bits | Mnemonic |
|---|---|---|
| ESG Session Partition Declaration{ | | |
|   num_fields | | |
|   overlapping | | |
|   reserved | | |
|   for(k=0; k<num_fields; k++) { | | |
|     field_identifier[k] | | |
|     field_encoding[k] | | |
|     field_length[k] | | |
|   } | | |
|   n_o_IPStreams | 8 | uimsbf |
|   IPVersion6 | 1 | bslbf |
|   Reserved | 7 | bslbf |
|   for(i=0; i<n_o_IPStreams; i++){ | | |
|     SessionType | 8 | uimsbf |
|     IPStreamID[i] | 8 | uimsbf |
|     if(IPVersion6){ | | |
|       ESGSourceAddress[i] | 128 | bslbf |
|       IPAddress[i] | 128 | bslbf |
|     }else{ | | |
|       ESGSourceAddress[i] | 32 | bslbf |
|       IPAddress[i] | 32 | bslbf |
|     } | | |
|     Port[i] | | |
|     SessionID[i] | 16 | uimsbf |
|     for(k=0; k<num_fields; k++) { | | |
|       if(field_length[k]==0){ | | |
|         length[i][k] | 8+ | vluimsbf8 |
|       } | | |
|       if(overlapping){ | | |
|         start_field_value[i][k] | | bslbf |
|       } | | |
|       end_field_value[i][k] | | bslbf |
|       nextByteBoundary() | | |
|     } | | |
|   } | | |
| } | | |

FIG.11

SYSTEM AND METHOD FOR PROVIDING NOTIFICATION MESSAGE IN DVB-H SYSTEM

PRIORITY

This application claims the benefit under 35 U.S.C. §119(a) of an application entitled "System And Method For Providing Notification Message In DVB-H System" filed in the Korean Industrial Property Office on Aug. 18, 2006. and assigned Serial No. 2006-0078409, the contents of which are incorporated herein by reference.

BACKGROUND OF THE INVENTION

1. Field of the Invention

The present invention relates generally to a Digital Video Broadcasting-Handheld (DVB-H) system, and more particularly to a system and a method for providing a terminal with a notification message reporting system and service changes in the middle of a DVB-H broadcasting service.

2. Description of the Related Art

DVB-H specifies technical standards which have been established for the purpose of improving the receptibility of a Digital TeleVision (DTV) during motion, and the letter 'H' represents 'Handheld.' It supports mobile multimedia broadcasting, which provides high quality audio and image services anytime and anywhere, even during driving or walking.

A service model using this DVB-H has the following configuration. Above all, a sending side is configured with a network through which common carriers and broadcasters interact with one another according to standards of the Digital Video Broadcasting-Universal Mobile Telecommunications System (DVB-UMTS). The broadcasters deliver compressed data to a terminal in a transmission scheme of DVB-H on the basis of Digital Video Broadcasting-Advanced Video Coding (DVB-AVC) standards. The terminal communicates with the common carriers according to communication standards such as the Digital Video Broadcasting-Universal Mobile Telecommunications System/Global System for Mobile communication (DVB-UMTS/GSM), and is now able to deliver information on the receiving-side to the broadcasters in real time via a communication network.

Most information pertinent to broadcasting is included in an Electronic Service Guide (ESG) in DVB-H, with which a user can choose an interesting TV or radio channel or an item to download. In addition, the ESG provides information allowing the terminal to be connected with a specified Internet Protocol (IP) stream included in the DVB-H transport stream. The whole process of managing the ESG is specifically divided into three processes as follows: bootstrapping the ESG, acquiring the ESG and updating the ESG.

Bootstrapping the ESG causes a terminal to perceive what kinds of ESGs the terminal can receive and how these ESGs are obtained. Acquiring the ESG causes the terminal to gather the ESG information and to manage the gathered ESG information. Updating the ESG causes the terminal to restore the ESG information having the latest version.

Changes can occur in a DVB-H system due to a variety of factors in the middle of receiving services of high-quality voice and images, and some of the changes can be vital information.

However, a framework for transmitting a notification message has not been defined in standards of Digital Video Broadcasting-Handheld Convergence of Broadcasting and Mobile Service Electric Service Guide (DVB-H CBMS ESG). Thus, it is difficult to expand the function of transferring the notification message into a diversity of functions such as a prior notification regarding various types of changes or prior notification services for application services. Consequently, there exists a need for a method for transferring notification information which is not defined in standards.

SUMMARY OF THE INVENTION

As described above, it is natural that the reliable and efficient transmission of a notification massage signifying the contents of changes related to services, and a response to the transmission of the notification massage are highly important in a DVB-H system. Therefore, a concrete technology for determining values of attributes and elements of information needed to construct the notification message is required.

Accordingly, the present invention has been made to solve the above problems occurring in the prior art, and it is an object of the present invention to provide a system and a method for providing a notification message which has various types and can be transmitted in the middle of a DVB-H broadcasting service.

An object of the present invention to provide a system and a method for determining values of attributes and elements of information needed to construct the notification message and for providing a notification message reporting changes of a system and a service.

According to the present invention, there is provided a method for providing a notification message in a DVB-H system, including constructing an ESG so that the ESG includes channel information related to the transmission of a notification message, and for transmitting the constructed ESG by a DVB-H service provider, receiving the ESG and detecting a position path of the channel information from the received ESG data session by a terminal, and acquiring by a terminal the channel information on the basis of the detected position path.

According to the present invention, there is provided a method for providing a notification message in a DVB-H system, including specifying by a DVB-H service provider a notification session so that channel information related to the transmission of a notification message is included during the notification session; constructing an ESG including the notification session, and transmitting the constructed ESG by a DVB-H service provider and receiving the ESG during a DVB-H service, and perceiving the notification session including the channel information by a terminal.

According to the present invention, there is provided a system for providing a notification message in a DVB-H system, including a DVB-H service provider for constructing an ESG so that the ESG includes channel information related to the transmission of a notification message, and for transmitting the constructed Electric Service Guide (ESG); and a terminal for receiving the ESG, for detecting a position path of the channel information from the received ESG data session, and for acquiring the channel information on the basis of the detected position path.

According to the present invention, there is provided a system for providing a notification message in a DVB-H system, including a DVB-H service provider for specifying a notification session so that channel information related to the transmission of a notification message is included during the notification session, for constructing an ESG including the notification session, and for transmitting the constructed ESG, and a terminal for receiving the ESG during a DVB-H service, and for perceiving the notification session including the channel information.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The same elements will be designated by the same reference numerals all through the following description and drawings although they are shown in different drawings. The next description includes detailed and specified contents which are presented in support of more comprehensive perception of the present invention. Further, in the following description of the present invention, a detailed description of known functions and configurations incorporated herein will be omitted when it may make the subject matter of the present invention rather unclear.

In the present invention, a notification message is created and transmitted to a terminal receiving a broadcasting service when changes of a service or a system in the DVB-H broadcasting service arise or an urgent notice must be conveyed. Information of a channel on which the notification message according to the present invention is transferred can be forwarded to the terminal through an ESG.

To efficiently describe the present invention, a transmission scheme of the ESG in the DVB-H is first described, and formats of notification messages according to preferred embodiments of the present invention and an operation of a system corresponding to the formats, are later described.

First, a terminal is to acquire information essentially required to receive a service provided by a service provider by receiving an ESG stream. When a user has selected a specified service, by using the acquired information, the terminal gains access to a data stream transmitted so as to provide the service, and then receives data. The information required for the terminal to access the data stream is transmitted by using ESG fragments.

According to the ESG data model, several fragments of the ESG data are grouped into one fragment set and are then included in one container, which is considered and transmitted as one object during a flute session.

Figure 1:
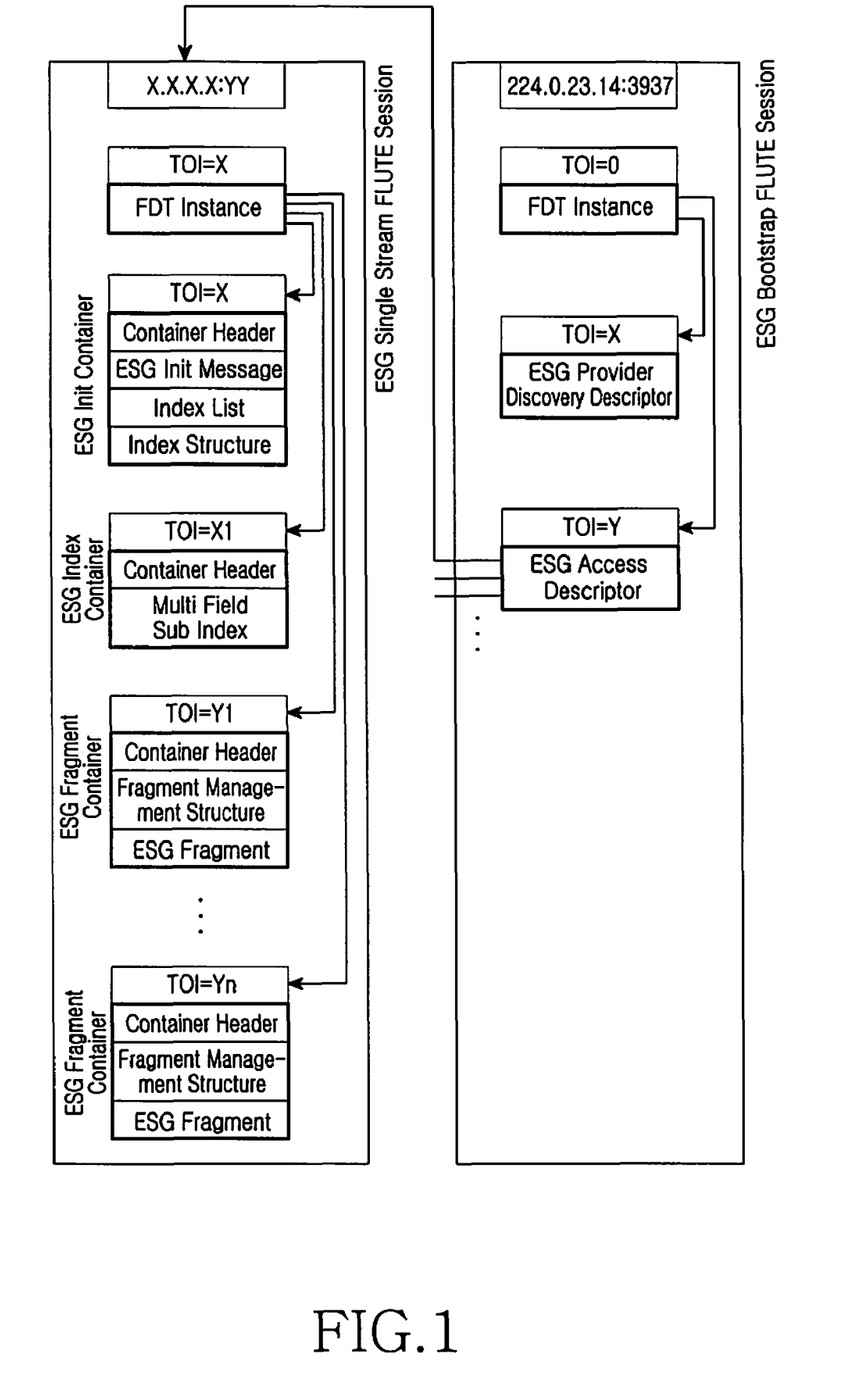
FIG. 1 illustrates a transmission mode of an ESG single stream according to a preferred embodiment of the present invention.

A first description is presented in a mode of ESG single stream transport. ESG containers are transmitted during a same flute session as illustrated in FIG. 1. This session can be retrieved through an ESG access descriptor forwarded from an ESG bootstrap session.

Figure 2:
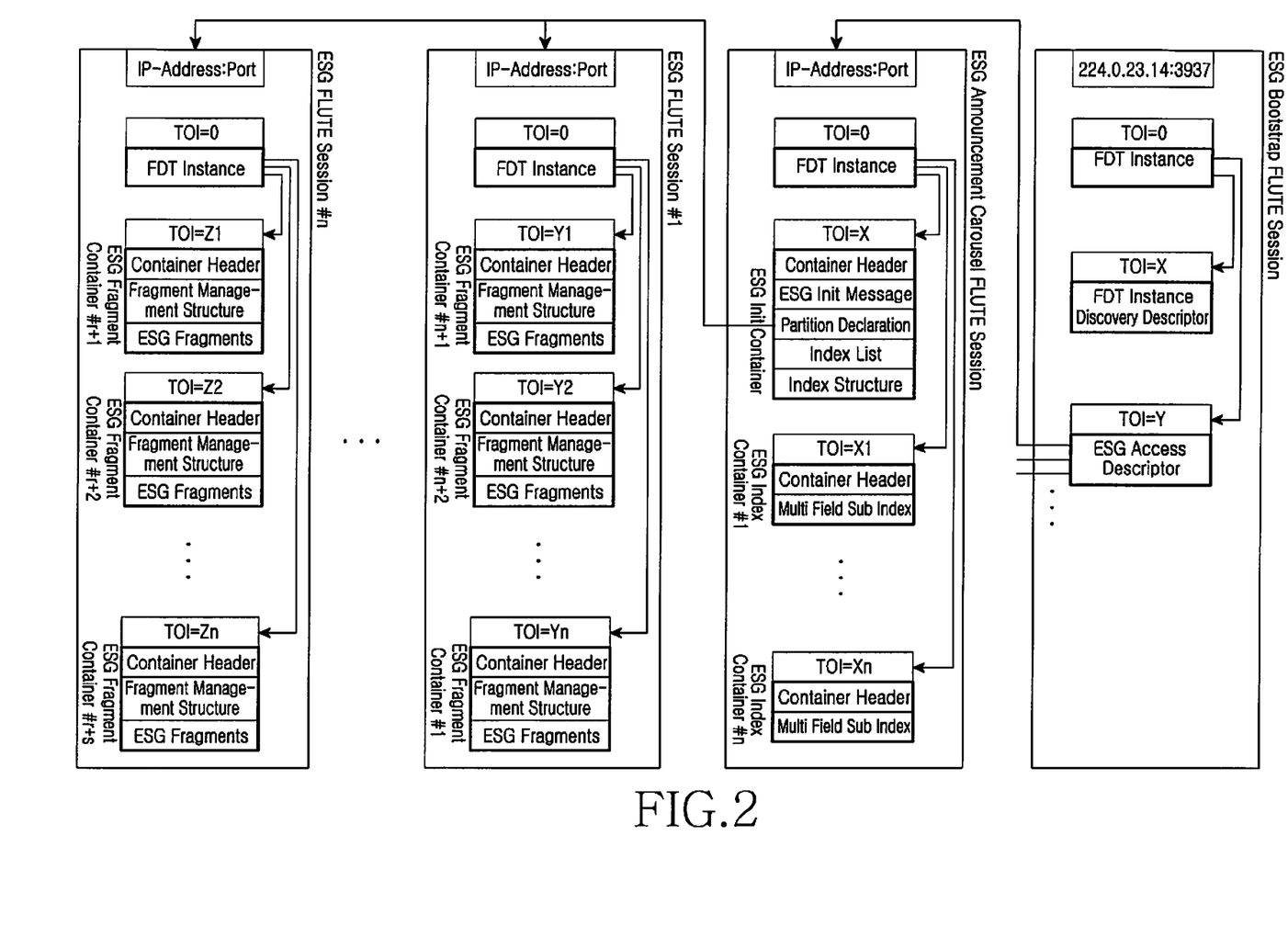
FIG. 2 illustrates a transmission mode of ESG multiple streams according to a preferred embodiment of the present invention.

In a mode of ESG multiple stream transport, ESG containers are transmitted during more than three sessions, as illustrated in FIG. 2. During an ESG bootstrap session, an ESG announcement carousel flute session is specified. The number of sessions, during which the actual ESG containers are transmitted, and information on the sessions, are perceived during the ESG announcement carousel flute session.

Referring to FIG. 2, the terminal is informed of information on a channel (hereinafter channel information) of the ESG bootstrap session so as to transmit the ESG. If the terminal is connected with the channel according to the channel information, the terminal receives bootstrap information, which includes an ESG provider descriptor and an ESG access descriptor. Through the ESG provider descriptor, information such as an ID, a name and a logo related to the ESG provider are forwarded, and through the ESG access descriptor, information on an announcement carousel of the ESG the number of each IP session and the address during which the ESG is transferred, are forwarded.

During the announcement carousel of the ESG, an ESG init container and index information of the ESG are forwarded. Information which is included in the ESG init container and is forwarded through the ESG init container, is as follows. An option of a decoder for deciphering the ESG is included in and transmitted through the ESG init container. When the ESG is transferred during multiple sessions, information on a division reference by each session and on a channel of each session are included in a partition declaration, and are transmitted through the partition declaration. Fragments of the ESG to be forwarded, and information on mapping between containers are included in and are transmitted through an index list and an index structure. The ESG flute session illustrated in FIGS. 1 and 2 signifies an ESG data session.

The ESG is included in and then forwarded with a container. Each container includes a fragment management structure denoting information on fragments constructing the container and the ESG fragments.

This data model of the ESG includes a service fragment, a schedule fragment, a contents fragment, an acquisition fragment, a service bundle fragment, a purchase fragment and a purchase channel fragment. The ESG has information on a broadcasting service, and is forwarded to the terminal by using a separate Internet Protocol (IP) stream at a separate time from an actual data stream. Hence, it is possible that the service provider offers a user information, which the user must have perceived before receiving a service, by using an ESG model before providing the service. By receiving the ESG model, the terminal acquires information inevitably required to receive the service offered by the service provider.

When the user selects a specified service, the terminal gets access to a data stream, transmitted so as to provide the service, by using the acquired information, and then receives data.

The service fragment contains explanations of the entire service, and the acquisition fragment contains service access information which must be known before the reception of the service. Each fragment can refer to another fragment. Herein, "to refer to" is to inform of current fragment information connected with the current fragment by using information transmitted from other fragments. That is, in order to perceive various types of information required for the terminal to receive the service, e.g., session information used in a protocol to be transferred, the terminal receives and demodulates the acquisition fragment to which the service fragment refers, and can then obtain the relevant information, i.e., an IP address and port information.

Preferred embodiments of the present invention will be separately described as in the next. A method according to a first embodiment of the present invention includes transmitting information of a channel, on which a notification message is transferred, to a terminal by using service and acquisition fragments of an ESG; and acquisition by the terminal of the information of the channel, on which the notification message is transferred by using the service and acquisition fragments. In a second embodiment of the present invention, a description is given to a case where information of a channel, on which a specific notification message is forwarded, is transmitted to a terminal by using the acquisition fragment, and the terminal receives the information of the channel. Herein, because the transmission and the reception thereof are supplied for only a user who uses a specified service, the transmission and the reception thereof are dependent on a service. A method according to a third embodiment of the present invention includes transmitting information of a channel, on which a notification message is transferred, to a terminal by using a partition declaration of an ESG session of an init container; and confirmation by the terminal of the channel information. Both first and third embodiments explain a case of the transmission of a general notification message independent of the service. So to speak, both embodiments are applicable to a case of the transmission of the notification message to all users regardless of broadcasting companies which provide services. A description will first be given to a scheme for constructing an ESG by using information of a channel on which a notification message is transferred, and forwarding the constructed channel information, which corresponds to the first embodiment of the present invention.

When the notification message is a usual notification message, the channel information representing the transmission path of the notification message is transferred by using service and acquisition fragments of the ESG. The channel information is inserted into the service fragment in the manner illustrated in Table 1, and is then transferred.

TABLE 1

```
<service
clearToAir="true"freeToAir="true"serviceID="cbms://samsung.com/
service/4"xmlns:mpeg7:schema:2001"
    <ServiceName>Notification Service</ServiceName>
    <ServiceDescription>Notification Session Info</ServiceDescription>
    <ServiceType href="urn:dvb:ipdc:esg:cs:ServiceTypeCS:1.4">
        <tva:Namexlms:tva="urn:tva:meladata:2005"xlm:lang="en"phonetic-
Alphabet="sampa">NotificationService</tva:Name
    </ServiceType>
```

TABLE 1-continued

```
    <AcquisitionRef IDRef="cbms://samsung.com/acquisition/100" />
</Service>
```

As shown in Table 1, by using the service fragment, reference is specified for the acquisition fragment (i.e., notification information) having the information of the channel on which a terminal receives the notification message. The reference specified for the acquisition fragment is "cbms://samsung.com/acquisition/100" as shown in Table 1. In the present invention, if the reference of the acquisition fragment is known, the terminal can read information related to the acquisition fragment in the position corresponding to the reference. If the acquisition fragment is defined as in Table 2. according to the present invention, the information of the channel on which the notification message is forwarded can be known with service discovery protocol (sdp) files.

As shown in Table 2, if the terminal detects a file named "sdp/notification.sdp" in the acquisition fragment, the terminal can obtain the relevant IP address and port information. This IP address and the port information implies information of a channel on which the terminal can receive a usual notification message. Namely, a method in which the terminal can receive the usual notification message implies that the terminal can receive the general notification message when the usual notification message gives notice of the IP address and the port information.

TABLE 2

```
<Acquisitionxmlns="urn:dvb:ipdc:esg:2005"acquisitionID="cbms:
samsung.com/acquisition/100"contentMlmeType="application/
octetstream
-<ComponentDescription>
    - <SessionDescription    xmlns:xsi="http://www.w3.org/2001/
HMLSchema-Instance" xsi:type="SDPRefType">
        - <SDPStream>
            <1[CDATA[    r=0    o=2SG    10001    1    IN    IP4
192.168.1.65
a=ESG_SAMSUNG i-SAMSUNG ESG t=0 0 o=source-filter:    IN IP4
    *    192.168.1.65    a=flute-tai:1    a=flute-ch:1
m=application    4000    FLUTE/UD2 0 c=IN I24 225.6.7.11/32 ]]>
        </SDPStream>
        <SDPLRI>sdp/notification.sdp</SDPURI>
    <SessionDescription>
    </ComponentDescription>
</Acquisition>
```

A notification service is additionally defined as servicetype (refer to a part designated by reference numeral 300 in FIG. 3) plus existing services including a TV service, a radio service and a data service. The servicetype used in the service fragment shown in Table 1, as shown in FIG. 3, is now able to be used by additionally defining notification servicetype in the definition of annex c. default classification scheme found in standards of the CBMS ESG. By additionally defining the notification service as above, the notification servicetype can be specified for the servicetype shown in Table 1. At this point, the notification servicetype is not displayed on a channel list on the user interface of the terminal.

Figure 4:
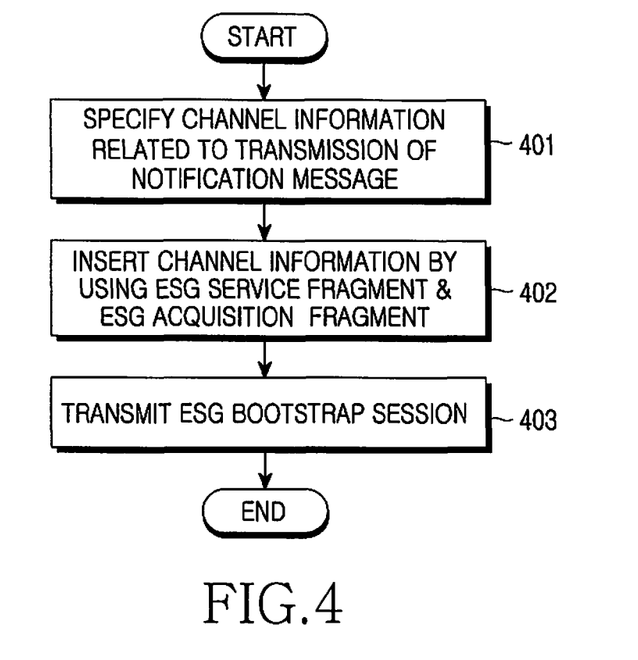
FIG. 4 illustrates an operation of generation and transmission of notification information independent of a service according to a first embodiment of the present invention.

FIG. 4 illustrates an operation of generation and transmission of notification information independent of a service according to a first embodiment of the present invention.

Referring to FIG. 4, in step 401, a service provider specifies information of a channel on which a notification message is transmitted to a terminal. So that the service provider may insert into an ESG flute session the information of the channel on which the notification message is transmitted to the terminal, the service provider specifies the position of the ESG flute session for an ESG bootstrap session, and inserts an IP address and port information (i.e., the information of the channel on which the notification message is transmitted) into an ESG data session in the form of extensible markup language (xml) schema. Specifically, in step 402, the service provider inserts the channel information into an acquisition fragment by using service and acquisition fragments during the ESG flute session. In step 403, the service provider completes the ESG bootstrap session by adding the service fragment and the acquisition fragment to other fragments, and transmits the completed ESG bootstrap session to the terminal. A process for inserting the channel information includes specifying the notification servicetype for the servicetype used in the service fragment among the ESG fragments, inserting the reference pertinent to the acquisition fragment so that the service fragment may refer to the acquisition fragment, and inserting the channel information into an sdp file of the acquisition fragment corresponding to the reference.

Figure 5:
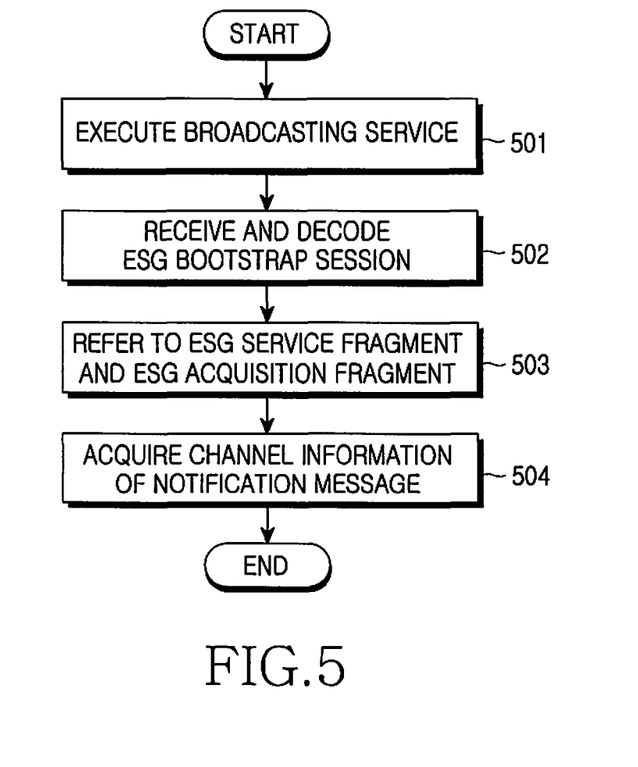
FIG. 5 illustrates an operation with which a terminal receives notification information independent of a service according to a first embodiment of the present invention.

FIG. 5 illustrates an operation with which a terminal receives notification information independent of a service according to a first embodiment of the present invention.

Referring to FIG. 5, if a broadcasting service is executed by a user in step 501, the terminal receives an ESG bootstrap session to decode the received ESG bootstrap session in step 502. Namely, the terminal decodes an ESG access descriptor of the ESG bootstrap session. On this, the terminal obtains information required to be able to receive an ESG, and receives the ESG by using the information. Next, the terminal refers to service and acquisition fragments among ESG fragments in step 503, and in step 504, acquires channel information of notification message. Namely, step 504 is now able to acquire an IP address and port information necessary to receive a usual notification message from an sdp file included in the acquisition fragment. In this manner, the terminal can be informed of at which IP address and through which port the notification message is forwarded. Once the terminal obtains such channel information, the terminal can receive the notification message by using the channel information, and can optionally determine to receive the notification message as necessary.

In addition, according to the second embodiment of the present invention, channel information required to transfer a specific notification message is inserted into an acquisition fragment among ESG fragments in the manner of Table 3, and the inserted channel information is then transmitted.

TABLE 3

```
<complexType name="NotificationComponentType">
    <complexContent>
        <extension base="esg:ComponentCharacteristicType">
            <sequence>
                <element     name="NotificationType"
cype="string" minOccurs="O" maxOccurs="unbounded"/>
            </sequence>
        </extension>
    </complexContent>
</cmplexType>
```

Table 3. shows notificationcomponenttype schema in the form of xml. In Table 3, notificationcomponenttype is appended to componentcharacteristictype of the acquisition fragment instead of existing component types including a TV component type, a radio component type and a data component type.

Table 4. shows that a specific channel is assigned to a servicename of the service fragment. When the specific channel is assigned in the service fragment in this manner, the terminal refers to reference of the acquisition fragment pertinent to the specific channel, and is now able to obtain a relevant IP address and port information in the position containing an sdp file included in the acquisition fragment.

TABLE 4

```
<Service serviceID="cbms://Samsung.com/Channel1">
    <ServiceName>Channel1</ServiceName>
    <AcquisitionRef IDRef="cbms://samsung.com/Acquisition/Channel1"/>
    <AcquisitionRef
IDRef="cbms://Samsung.com/Acquisition/Channel100" />
    <!-- notification acquisition -->
</Service>
<Acquisition           contentLineType="application/x-sdp"
acquisitionID="cbms://samsung.com/Acquisition/Channel100">
    <ComponentDescription>
        <ComponentCharacterictic
xsi:type="NotificationComponentType"/>
        <SessionDescription
xmlns:xsi="http://www.w3.org/2001/XMLSchema-instance"
xsi:type="SDPRefType">
            <SDPStream><![CDATA[v=0
D=ESC 10001 1 IN    IP4 192.168.1.65
S=ESG_SAMSUNG    i=SAMSUNG    ESG
T=0 0
a=source-filter:   IN    IP4    192.168.1.65
a=flute-tsi:1   a=flute-ch:1   IO=application  4000
FLUTE/UDP   0  c=IN  IP4   225.6.7.11/32]]>
            </SDPStream>
            <SDPURI>-sdp/notification.sdp</SDPURI>
        </SessionDescription>
    </ComponentDescription>
</Acquisition>
```

As described above, in the second embodiment of the present invention, since the notification information inserted into the acquisition fragment is forwarded when a specific service is assigned in the service fragment, the notification message is transmitted to only a user who is supplied with the specified service. Namely, the transmission of the notification message the according to the second embodiment of the present invention is dependent on the service.

Hereinafter, with reference to FIG. 6, an operation of generation and transmission of notification information dependent on a service according to the second embodiment of the present invention, will be described.

Figure 6:
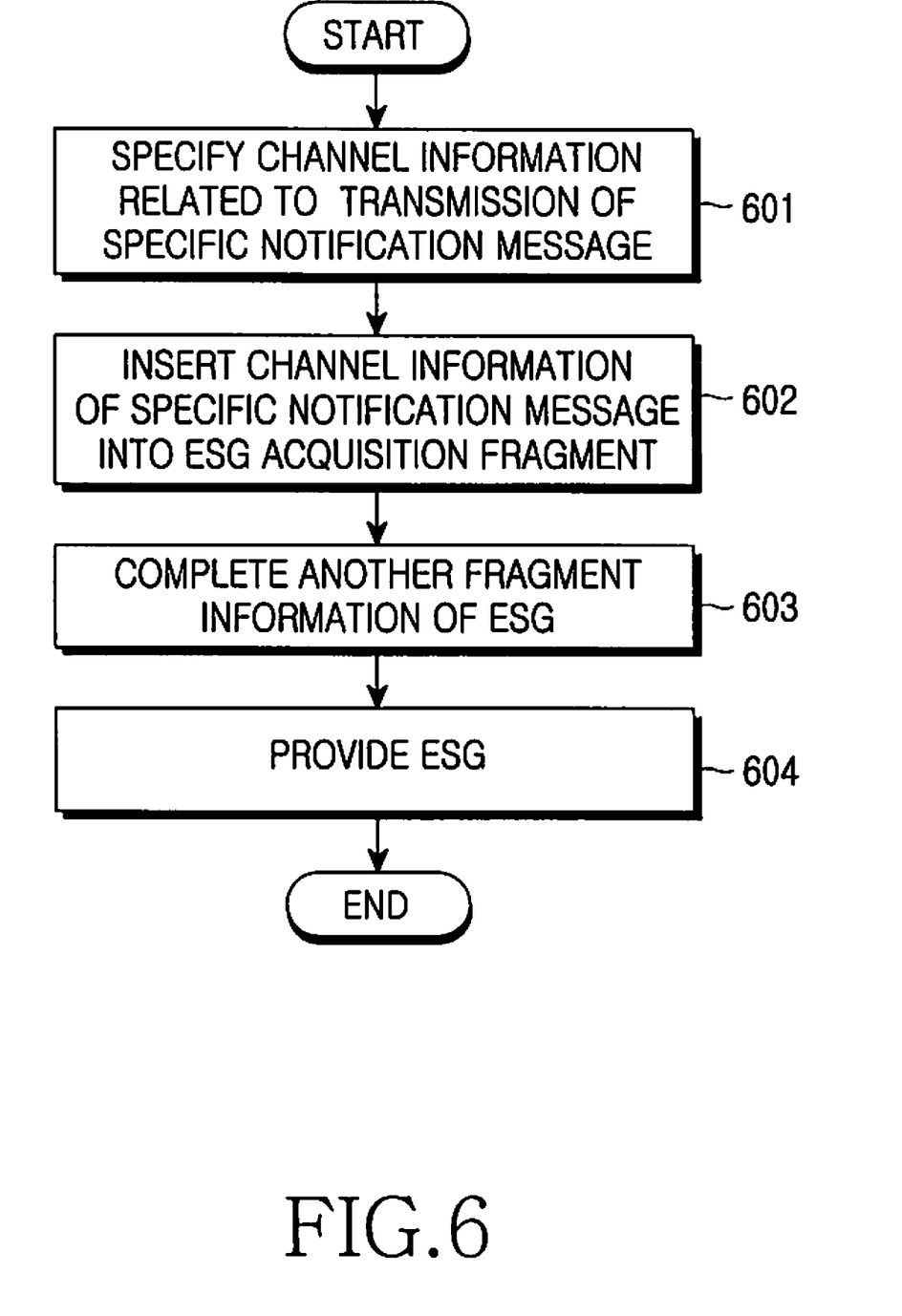
FIG. 6 illustrates an operation of generation and transmission of notification information dependent on a service according to a second embodiment of the present invention.

Referring to FIG. 6, in step 601, a service provider specifies information of a channel on which a specific notification message is transferred to a terminal. Namely, the service provider specifies the channel information signifying at which IP address and through which port the notification message is transferred to a terminal. In step 602, the service provider inserts the channel information relevant to the specific notification message into an ESG acquisition fragment. In step 603, the service provider combines an ESG acquisition fragment and other fragments to complete an ESG, and transmits the completed ESG to the terminal in step 604.

Figure 7:
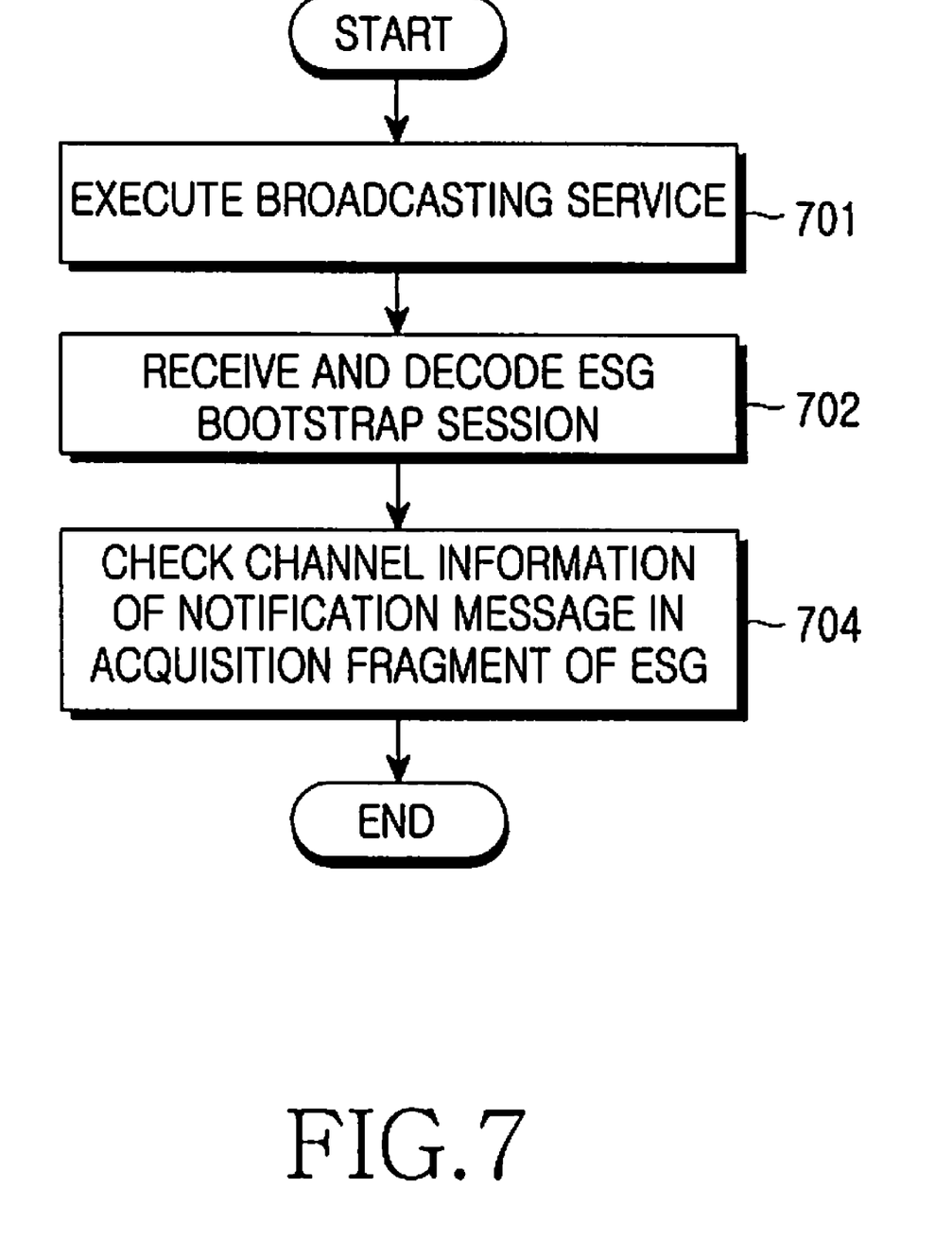
FIG. 7 illustrates an operation for receiving notification information dependent on a service according to a second embodiment of the present invention.

FIG. 7 illustrates an operation for receiving notification information dependent on a service according to a second embodiment of the present invention.

Referring to FIG. 7, if a broadcasting service is executed in step 701, a terminal receives an ESG bootstrap session forwarded from a service provider to decode the received ESG bootstrap session in step 702. This helps the terminal acquire information required to be able to receive an ESG, and receives the ESG by using the information. In step 704, the terminal checks channel information pertinent to a specific notification message included in an acquisition fragment of the ESG. Namely, the terminal obtains an IP address and port information needed to receive the specific notification message.

As described above, in a transmission mode of an ESG single stream, as illustrated in FIG. 1, the terminal receives the ESG bootstrap session to perceive the ESG flute session, and gains direct access to the channel information inserted into the ESG flute session in the form of xml to acquire the IP address and the port information. Similarly, in a transmission mode of ESG multiple streams, the terminal once receives the ESG bootstrap session to search for the init container during the announcement carousel session as in FIG. 2, and detects the ESG flute session from the partition declaration included in the init container. As a result, the terminal is now able to obtain the IP address and port information as in the first embodiment of the present invention.

Next, a description will be given to a procedure according to a third embodiment of the present invention, wherein information of a channel on which is given a notification message is transmitted to a terminal by using a partition declaration of an ESG session of an init container, and wherein the terminal confirms the channel information. Since the channel information related to the notification message is transmitted independently of a service, the channel information can be transferred to all users.

Figure 8:
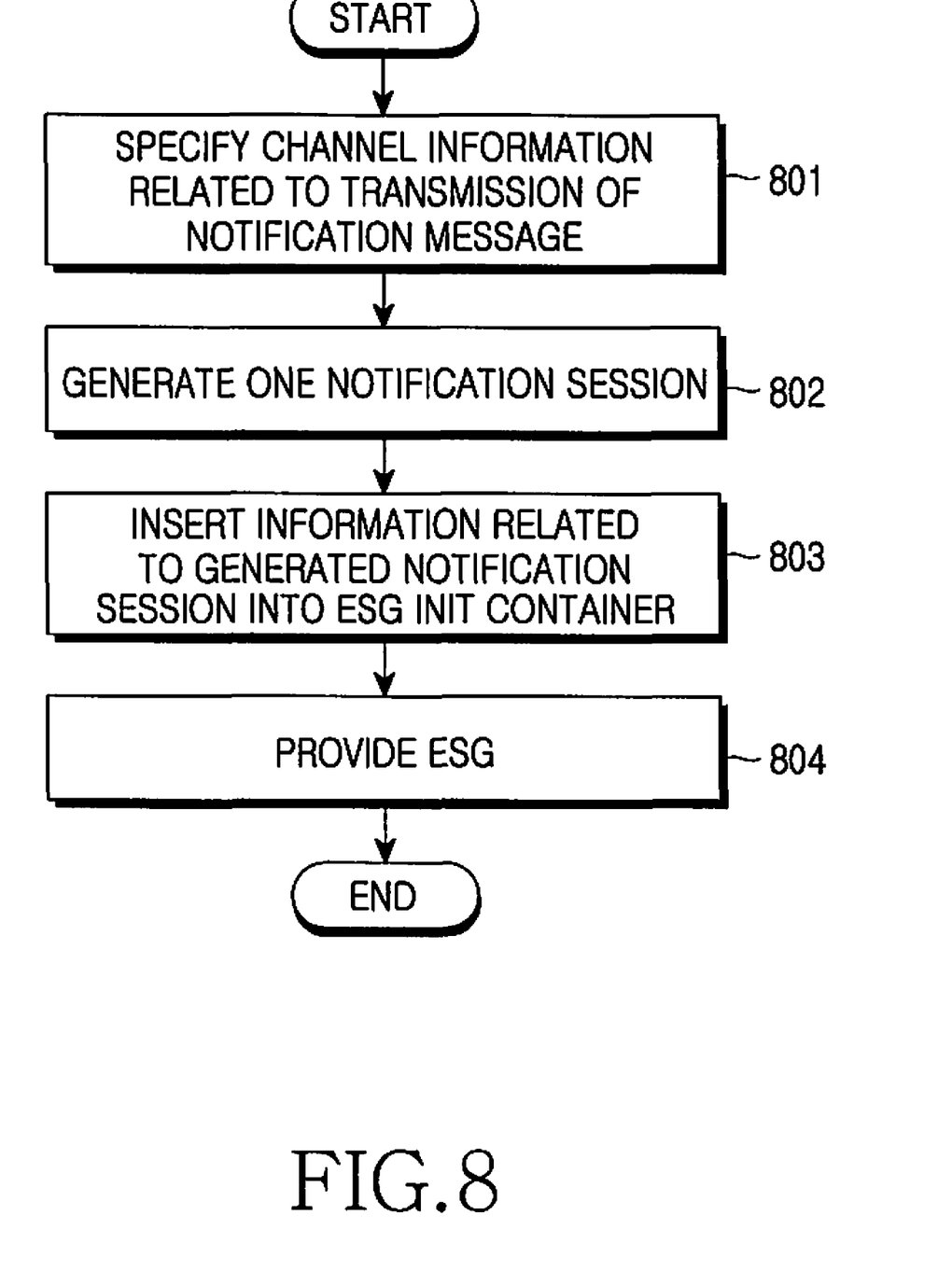
FIG. 8 illustrates an operation of generation and transmission of notification information independent of a service according to a third embodiment of the present invention.

FIG. 8 illustrates an operation of generation and transmission of notification information independent of a service according to a third embodiment of the present invention.

Referring to FIG. 8, in step 801, a service provider specifies information of a channel, including an IP address and port information on which a notification message is forwarded. Next, the service provider puts the channel information pertinent to the notification message together into one notification session in step 802, and inserts position information related to the notification session into an ESG init container in step 803. Through this process, the service provider completes an ESG to forward the completed ESG to a terminal in step 804. An option of a decoder for decoding the ESG is included in the ESG init container. Among elements of information in the ESG init container, information on a division reference by each session and on a channel of each session are inserted into a partition declaration, and fragments of the ESG to be forwarded and information on mapping between containers are inserted in an index list and an index structure. Particularly, information for indicating which session is a notification session is included in the partition declaration according to the third embodiment of the present invention. Thus, the service provider sets one of the sessions in the partition declaration of the init container to the notification session, and can provide the notification information to the terminal.

Figure 9:
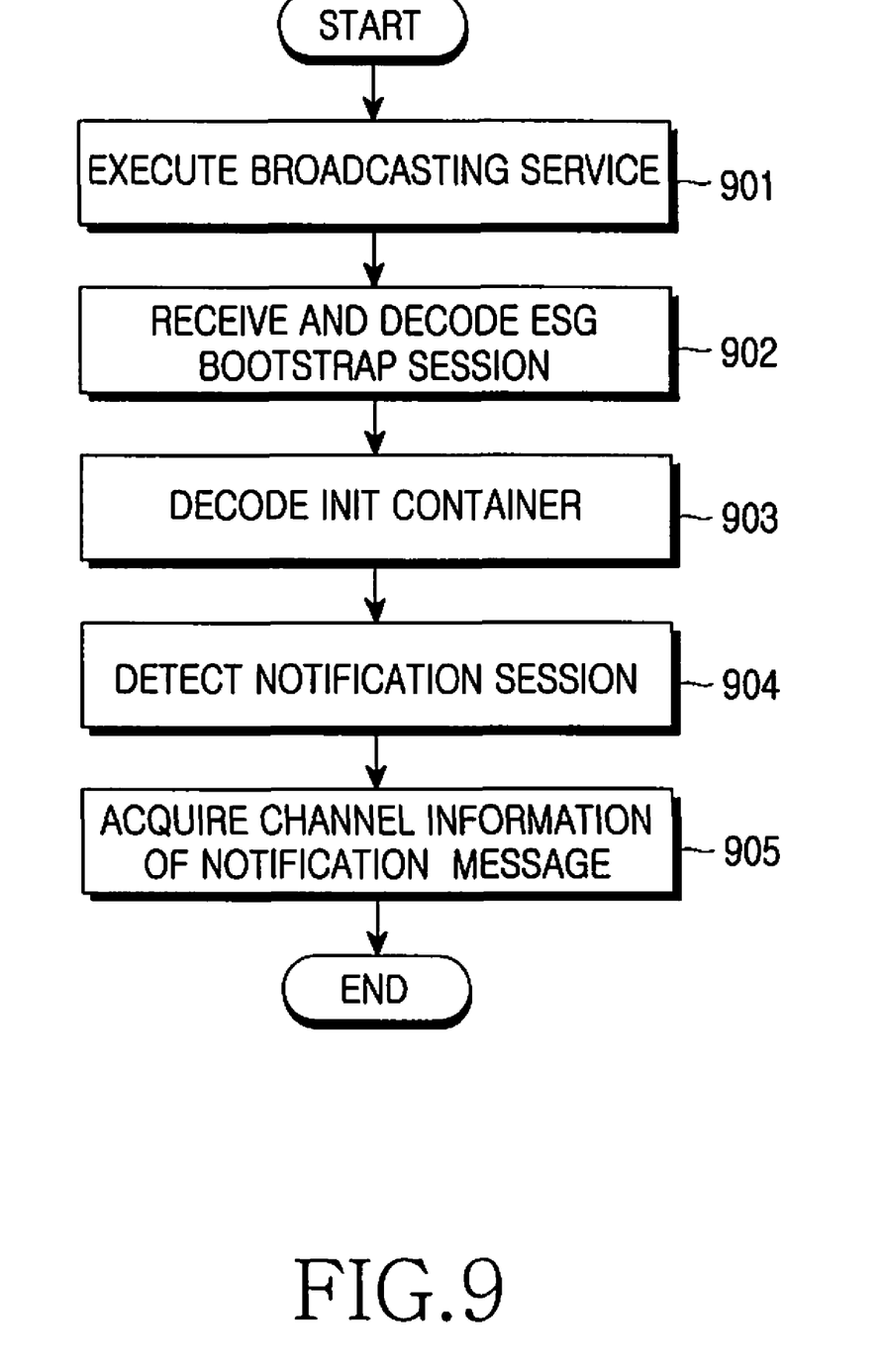
FIG. 9 illustrates an operation for receiving notification information independent of a service according to a third embodiment of the present invention.

FIG. 9 illustrates an operation for receiving notification information independent of a service according to a third embodiment of the present invention.

Referring to FIG. 9, if a broadcasting service is executed by a user in step 901, a terminal receives an ESG bootstrap session to begin decoding the received ESG bootstrap session in step 902. The terminal obtains information required to receive an ESG during an decoding operation, starts to receive the ESG, and accordingly receives an announcement carousel flute session. Hereupon, the terminal deciphers an ESG init container during the announcement carousel flute session in step 903, and detects a notification session in step 904. Namely, the terminal refers to a partition declaration of the ESG init container to detect which session is the notification session. If the terminal perceives the notification session in this manner and then ascertains only the notification session, the terminal is now able to acquire the channel information pertinent to the notification message in step 905.

Figure 10:
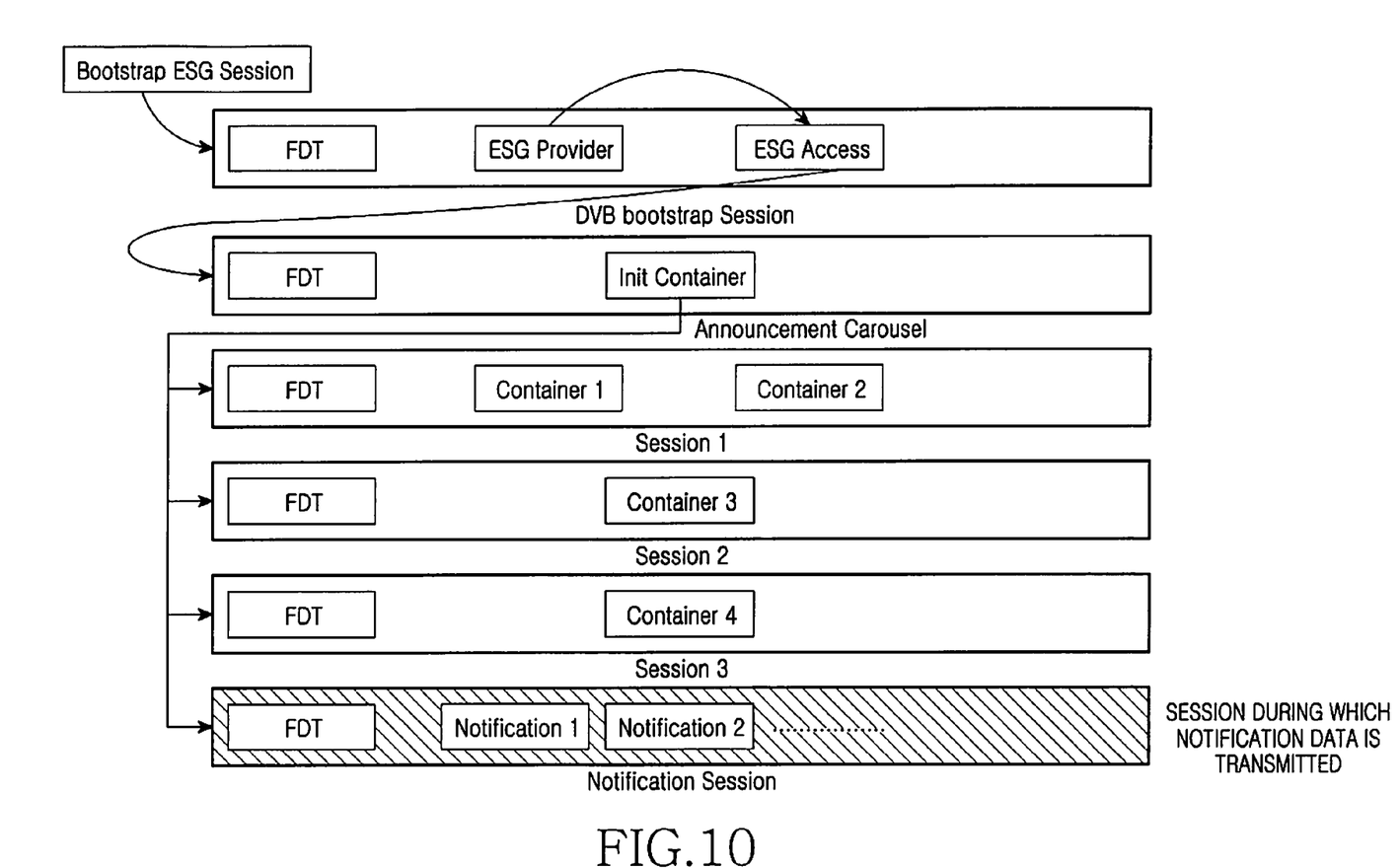
FIG. 10 illustrates a notification session transferred to a terminal according to a third embodiment of the present invention.

FIG. 10 illustrates a notification session transferred to a terminal according to a third embodiment of the present invention. As illustrated in FIG. 10, ESG access information during an ESG bootstrap session specifies an ESG announcement carousel flute session, and, in succession, an init container during the ESG announcement carousel flute session gives notice of information of and the number of sessions during which actual ESG containers are forwarded. Hence, the terminal can perceive the information related to the notification session during which the notification information is transmitted.

Figure 11:
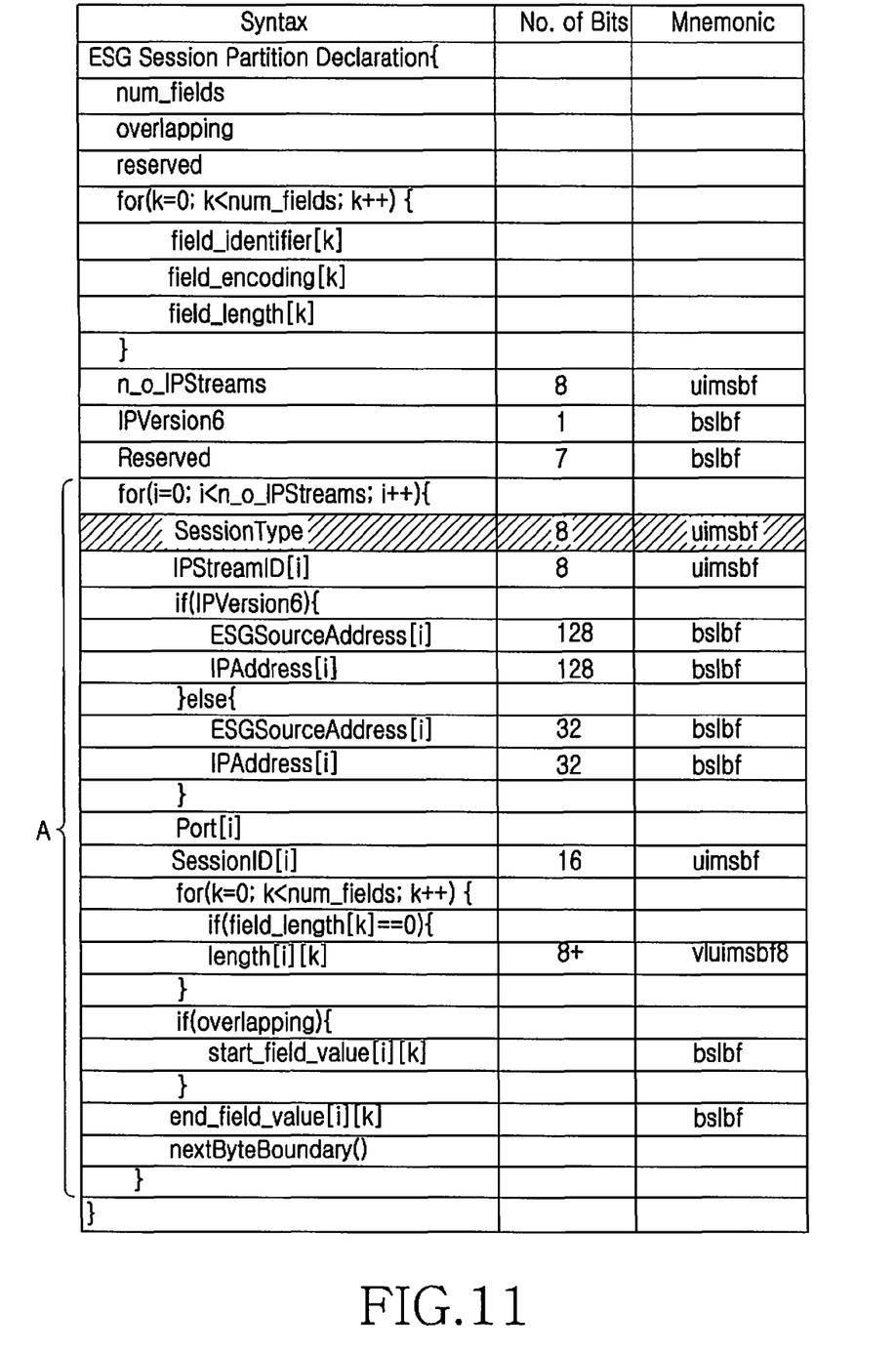
FIG. 11 illustrates an example of a syntax needed to perceive a notification session according to a third embodiment of the present invention.

In addition, the terminal can perceive a notification session on the basis of a syntax of an ESG partition declaration illustrated as in FIG. 11, which illustrates an example of a syntax needed to perceive a notification session according to a third embodiment of the present invention.

As illustrated in FIG. 11, a role of each session is defined in a part designated by reference numeral A, and analysis on the sessions can be accomplished by n_o_IPstream signifying the number of all the sessions. Particularly, according to the third embodiment of the present invention, a sessiontype field is appended as in a part on which oblique lines are drawn, and is set to a value for reporting which session corresponds to the notification session.

As described above, a method for providing a terminal with information of a channel on which each notification message is transferred through an ESG in the middle of a DVB-H broadcasting service, is presented through a plurality of embodiments, so that the expansion of a diversity of functions such as a prior notification regarding various types of the changes and prior notification services for application services, can be attained. Primarily, in the present invention, a method for transmitting the notification message in the DVB-H broadcasting service, is separately classified into a method for transmitting the notification message independently of the service and a method for transmitting the notification message dependently on the service, and the classified methods are presented. As a result, various types of notification messages can be later transferred.

The merits and effects of the preferred embodiments in the present invention, and as so configured to operate above, will be described as follows.

As described above, by preparing for reference to standards of DVB-H CBMS ESG required to transmit the notification message, the merits which enable various types of notification messages to be transmitted are produced. Furthermore, during the transmission of the notification message, by setting an ESG service fragment or ESG acquisition fragment, and notification session to an IP address and port information for forwarding the notification message, all headers corresponding to receiving signals need not be decoded, and therefore advantages which can reduce system overhead are generated. In addition, since a notification message is transferred independently of or dependently on a service, a more reliable scheme for forwarding the notification message can be attained.

While the invention has been shown and described with reference to certain preferred embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed is:

1. A method for providing a notification message in a Digital Video Broadcasting-Handheld (DVB-H) system, the method comprising the steps of:
receiving an Electronic Service Guide (ESG) data session including channel information related to transmission of a notification message;
acquiring the channel information from the received ESG data session; and
receiving the notification message using the channel information,
wherein the notification message is provided to a terminal during a service to notify the terminal of changes related to one or more services.

2. The method as claimed in claim 1, wherein the channel information includes an Internet Protocol (IP) address and port information, both of which are used during the transmission of the notification message.

3. The method as claimed in claim 1, further comprising:
determining a reference to an acquisition fragment in a service fragment of the received ESG data session; and
acquiring the channel information from a Service Discovery Protocol (SDP) file included in the acquisition fragment in a position corresponding to the reference.

4. The method as claimed in claim 3, wherein the channel information is transmitted through the service fragment and the acquisition fragment of the ESG data session.

5. The method as claimed in claim 1, wherein the channel information is transmitted through an acquisition fragment of the ESG data session.

6. A method for providing a notification message in a Digital Video Broadcasting-Handheld (DVB-H) service provider of a DVB-H system, the method comprising the steps of:
inputting channel information related to transmission of a notification message together into one notification session, and inserting information related to the notification session into an Electronic Service Guide (ESG) init container;
constructing an (ESG) including the notification session; and
transmitting the ESG during a DVB-H service so that a terminal is able to acquire the channel information from the notification session,
wherein the notification message is provided to the terminal during the DVB-H service to notify the terminal of changes related to one or more services.

7. The method as claimed in claim 6, wherein the information related to the notification session is inserted into a partition declaration of the ESG init container.

8. The method as claimed in claim 6, wherein the channel information includes an Internet Protocol (IP) address and port information, both of which are used during the transmission of the notification message.

9. A system for providing a notification message in a Digital Video Broadcasting-Handheld (DVB-H) system, the system comprising:
a DVB-H service provider for constructing an Electronic Service Guide (ESG) data session including channel information related to transmission of a notification message, and for transmitting the constructed ESG data session; and
a terminal for receiving the ESG data session, for aquiring the channel information from the received ESG data session, and for receiving the notification message using the channel information,
wherein the notification message is provided to the terminal during a service to notify the terminal of changes related to one or more services.

10. The system as claimed in claim 9, wherein the channel information includes an Internet Protocol (IP) address and port information, both of which are used during the transmission of the notification message.

11. The system as claimed in claim 9, wherein the DVB-H service provider transmits the channel information through a service fragment and an acquisition fragment of the ESG data session.

12. The system as claimed in claim 9, wherein the DVB-H service provider transmits the channel information through an acquisition fragment of the ESG data session.

13. A system for providing a notification message in a Digital Video Broadcasting-Handheld (DVB-H) system, the system comprising:
a DVB-H service provider for inputting channel information related to transmission of a notification message together into one notification session, for inserting information related to the notification session into an Electronic Service Guide (ESG) init container, for constructing an ESG including the notification session, and for transmitting the constructed ESG; and
a terminal for receiving the ESG during a DVB-H service, and for acquiring the channel information from the notification session,
wherein the notification message is provided to the terminal during a DVB-H service to notify the terminal of changes related to one or more services.

14. The system as claimed in claim 13, wherein the DVB-H service provider inserts information related to the notification session into a partition declaration of the ESG init container during an announcement carousel session of the ESG.

15. The system as claimed in claim 13, wherein the channel information includes an Internet Protocol (IP) address and port information, both of which are used during the transmission of the notification message.

* * * * *